US011482956B2

(12) United States Patent
Augsburger et al.

(10) Patent No.: US 11,482,956 B2
(45) Date of Patent: *Oct. 25, 2022

(54) ARRANGEMENT COMPRISING AN ASYNCHRONOUS MACHINE AND METHOD FOR OPERATING SAME

(71) Applicant: SIEMENS ENERGY GLOBAL GMBH & CO. KG, Munich (DE)

(72) Inventors: Friedemann Augsburger, Altdorf (DE); Rainer Gruber, Heilsbronn (DE); German Kuhn, Erlangen (DE); Alexander Rentschler, Bensheim (DE); Kunal Sharma, Erlangen (DE)

(73) Assignee: Siemens Energy Global GmbH & Co. KG, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/770,177

(22) PCT Filed: Dec. 5, 2017

(86) PCT No.: PCT/EP2017/081550
§ 371 (c)(1),
(2) Date: Jun. 5, 2020

(87) PCT Pub. No.: WO2019/110090
PCT Pub. Date: Jun. 13, 2019

(65) Prior Publication Data
US 2021/0167705 A1 Jun. 3, 2021

(51) Int. Cl.
H02P 9/00 (2006.01)
H02P 1/26 (2006.01)

(52) U.S. Cl.
CPC ............... H02P 9/007 (2013.01); H02P 1/26 (2013.01)

(58) Field of Classification Search
CPC .................................. H02P 9/007; H02P 1/26
See application file for complete search history.

(56) References Cited

U.S. PATENT DOCUMENTS

2002/0079706 A1* 6/2002 Rebsdorf ............... H02M 1/42
290/55
2011/0057446 A1* 3/2011 Mayor Lusarreta ...... H02P 9/42
290/44
(Continued)

FOREIGN PATENT DOCUMENTS

EP 2001120 A2 12/2008
EP 2280166 A1 2/2011
(Continued)

OTHER PUBLICATIONS

Zhang L et al: "Application of a Matrix Converter for the Power Control of a Variable-Speed Wind-Turbine Driving a Doubly-Fed Induction Generator", Proceedings of the IECON 197 : 23rd. International Conference on Industrial Electronics, Control, and Instrumentation. New Orleans, Nov. 9-14, 1997; [Proceedings of IEEE IECON: International Conference on Industrial Electronics, Control, and Instru, vol. 2, pp. 906-911, XP000898595, DOI: 10.1109/IECON.1997.672110, ISBN: 978-0-7803-3933-0; the whole documet; 1997.

(Continued)

Primary Examiner — Sean Gugger
(74) Attorney, Agent, or Firm — Laurence A. Greenberg; Werner H. Stemer; Ralph E. Locher

(57) ABSTRACT

An arrangement contains an asynchronous machine having a rotor and a stator. The arrangement is set up in a generator mode for feeding electrical energy into an AC voltage network. The arrangement is characterized in that the asynchronous machine can be doubly fed. The asynchronous machine can be connected in a matrix configuration to the AC voltage network by a modular multi-level converter, and (Continued)

the modular multi-level converter is set up in a motor mode of the arrangement for starting up the asynchronous machine while short-circuiting the rotor or the stator.

19 Claims, 5 Drawing Sheets

(56) References Cited

U.S. PATENT DOCUMENTS

| | | | | |
|---|---|---|---|---|
| 2014/0265327 | A1* | 9/2014 | Teichmann | H02P 9/08 |
| | | | | 290/31 |
| 2014/0327346 | A1* | 11/2014 | Rothenhagen | H02P 9/007 |
| | | | | 310/68 R |
| 2020/0204097 | A1* | 6/2020 | Augsburger | H02P 9/007 |

FOREIGN PATENT DOCUMENTS

| | | |
|---|---|---|
| EP | 2778352 A1 | 9/2014 |
| WO | WO 0191279 A1 | 11/2001 |
| WO | WO 2006072498 A1 | 7/2006 |

OTHER PUBLICATIONS

Kammerer Felix et al: "Benefits of Operating Doubly Fed Induction Generators by Modular Multilevel Matrix Converters", PCIM Europe 2013—International Exhibition and Conference for Power Electronics, Intelligent Motion, Renewable Energy and Energy Management Nuremberg, May 14-16, 2013—Proceedings., XP055458527, ISBN: 978-3-8007-3505-1, pp. 1-8, Figures 1-3; das ganze Dokument; 2013.

* cited by examiner

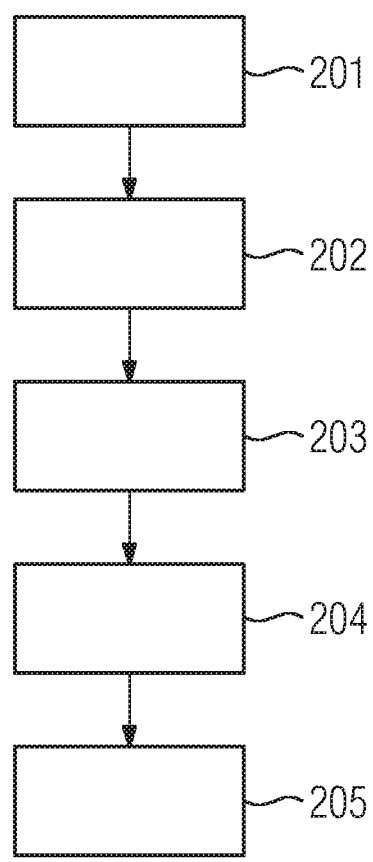

ARRANGEMENT COMPRISING AN ASYNCHRONOUS MACHINE AND METHOD FOR OPERATING SAME

BACKGROUND OF THE INVENTION

Field of the Invention

The invention relates to an arrangement comprising an asynchronous machine having a rotor and a stator, wherein the arrangement is set up to operate in a generator mode for the injection of electrical energy into an AC voltage grid.

Known electricity generating installations of larger rated capacity, which are customarily driven by turbines, are almost exclusively coupled to the AC voltage grid via synchronous generators. The AC voltage grid is generally an electricity supply or distribution system. Where a synchronous machine is employed, a mechanical turbine frequency is established by reference to the electrical network frequency or a whole-number divisor thereof. The fixed mechanical turbine frequency significantly restricts the optimization of the drive system with respect to efficiency, costs and performance. In the case of synchronous machines, full converters are customarily employed for the transmission of electric power which, however, are relatively cost-intensive, as it is necessary for the full capacity to be transmitted via the full converter, which must consequently be rated accordingly.

From WO 2006/072498 A1, the use as a generator of a double-fed asynchronous machine, driven by a drive system, in combination with a four-quadrant converter is known, in order to deliver a three-phase alternating electric current with a variable frequency. However, four-quadrant converters of this type are complex to produce.

SUMMARY OF THE INVENTION

The object of the invention is the proposal of a generic arrangement, which is as cost-effective and as flexible as possible in use.

According to the invention, this object is fulfilled by a generic arrangement, wherein the asynchronous machine is operable in a double-fed configuration, wherein the asynchronous machine is connectable to the AC voltage grid by means of a modular multi-stage converter in a matrix configuration, and wherein the modular multi-stage converter is designed to operate in a motor mode of the arrangement for the start-up of the asynchronous machine, with the short-circuiting of the rotor or the stator.

Accordingly, the asynchronous machine in the arrangement according to the invention is a double-fed asynchronous machine (double-fed induction generator, or DFIG). The asynchronous machine is connected to the AC voltage grid via the modular multi-stage converter, in a matrix configuration. The modular multi-stage converter is characterized by a modular structure. To this end, the modular multi-stage converter comprises two-pole switching modules, which can be interconnected in series, wherein each switching module comprises a power semiconductor circuit and a dedicated energy store. Each of the switching modules can be actuated individually by means of an actuation device. A voltage across, or present on a series-connected arrangement of switching modules is equal to the sum of the voltages across, or present on the associated switching modules. By means of the modular multi-stage converter, a particularly advantageous incremental alternating voltage can be generated. In the present context, a matrix configuration is a configuration of the multi-stage converter wherein a multi-phase output side alternating voltage on the generator is directly converted into a likewise multi-phase grid-side alternating voltage, i.e. in particular with no intermediate DC voltage circuit.

The employment of a modular multi-stage converter in a matrix configuration for the connection of a DFIG to the AC grid system provides the advantage of scalability. By means of its scalability, the modular multi-stage converter, by the employment of equivalent components, can be adapted to the respective application and the respective asynchronous machine or DFIG. This reduces the costs of the arrangement. A further advantage is provided in that it is necessary for the modular multi-stage converter in the arrangement according to the invention to be rated to a lower nominal capacity than the full converter according to the known arrangement, which also provides a cost benefit. Moreover, as a result of the above-mentioned advantageous sinusoidal waveform of the voltage or current which can be generated by means of the modular multi-stage converter, thermal stresses in the asynchronous machine can be reduced.

A further advantage of the arrangement according to the invention is that, by means of the arrangement according to the invention, the start-up or run-up of the asynchronous machine or the turbine-generator system is possible. To this end, the modular multi-stage converter, in a motor operating mode of the arrangement, is designed for the start-up of the asynchronous machine by short-circuiting the rotor or stator. To this end, by means of appropriate control, the multi-stage converter is designed, in the motor operating mode of the arrangement, to tap electrical energy from the AC voltage grid and employ it for the start-up of the asynchronous machine. The start-up or run-up of the asynchronous machine or the connected turbine is thus executed with the rotor or stator short-circuited. The invention is based upon the knowledge that the modular multi-stage converter, in a matrix configuration, can essentially only be operated in a technically appropriate manner if the voltage frequencies generated at the input and output of the multi-stage converter are sufficiently different. The configuration of the arrangement dictates that, upon the start-up of the asynchronous machine, the multi-stage converter should generate an output voltage with a starting frequency which corresponds, or closely corresponds to the difference between the turbine frequency and the network frequency in the AC voltage grid (wherein drift must be taken into consideration). Upon start-up, the turbine frequency is initially zero, such that the difference between the turbine frequency and the network frequency is equal to, or virtually equal to the network frequency. This means however that, in such a case, the input side frequency (in motor operating mode, on the side of the AC voltage grid) and the output side frequency (corresponding to the side of the asynchronous machine in motor operating mode) of the voltage on the multi-stage converter are equal, or virtually equal, if the asynchronous machine, as in the generator mode for the double-fed operation thereof, in addition to the connection via the multi-stage converter, is also connected directly to the AC voltage grid. Only the short-circuiting of the stator or the rotor ensures that the starting frequency, upon start-up, can be significantly lower than the network frequency. In this context, short-circuiting of the rotor or stator is understood as an electrical connection, particularly a low-resistance connection, of the individual phases of the rotor or the stator (or of the rotor windings or the stator windings) to one another, such that the phases are mutually short-circuited and, in particular, are symmetrically short-circuited. If, upon the start-up of the asynchronous machine, for example, the multi-stage converter supplies the rotor, only the short-circuiting of the stator ensures that, at least in an initial phase of start-up, the network frequency is present on the input side of the multi-stage converter, i.e. on the side of the AC voltage grid in motor operating mode, and that, on the output side, i.e. on the side of the asynchronous machine in motor operating mode, a frequency of zero or a low starting frequency is initially required. In this manner, the start-up or run-up of the asynchronous machine can thus be executed by means of the multi-stage converter, such that any further auxiliary start-up means such as, for example, an additional start-up converter or a special motor, can advantageously be omitted.

Appropriately, the modular multi-stage converter is connected to the rotor of the asynchronous machine. At the same time, the stator of the asynchronous machine is appropriately connected, by means of a dedicated connection, to the AC voltage grid. In a sub-synchronous generator operating mode of the asynchronous machine, the rotor draws compensating electrical energy from the AC voltage grid via the multi-stage converter. The total energy delivered by the asynchronous machine is thus injected via the stator into the AC voltage grid. The total energy, or the corresponding total capacity, is greater than the compensating energy or compensating capacity. For this reason, the modular multi-stage converter can be rated for a relatively low nominal capacity. According to one form of embodiment of the invention, the modular multi-stage converter is rated for a nominal capacity of between 20% and 50% of the nominal input power of the asynchronous machine. The nominal input power corresponds, for example, to the nominal mechanical power delivered by a turbine which is connected to a shaft of the asynchronous machine.

According to one form of embodiment of the invention, the modular multi-stage converter, by means of appropriate switching devices, is optionally connectable to the rotor or the stator of the asynchronous machine. By this configuration of the invention, it is possible for the multi-stage converter to supply either the rotor or the stator. It is thus possible, for example, upon the start-up of the asynchronous machine, for the rotor to be short-circuited, while the multi-stage converter supplies the stator. In normal operation, short-circuiting of the rotor can be discontinued, wherein the multi-stage converter is connected to the rotor.

The arrangement preferably incorporates a short-circuiting device for the short-circuiting of the rotor, or a short-circuiting device for the short-circuiting of the stator, wherein the short-circuiting device comprises at least one (optionally grounded) resistance element. Short-circuiting is thus executed via a resistor. Both variants, namely, the short-circuiting of the stator and the short-circuiting of the rotor, are achievable in this manner. The short-circuiting device can comprise one or more resistance elements, connected in series with an appropriate short-circuiting switch. According to one exemplary embodiment, the stator can be connectable to ground via the short-circuiting device. In such a case, the multi-stage converter can be appropriately connected, or connectable, to the rotor. In an alternative example, the rotor can be connectable to ground via the short-circuiting device. At the same time, the multi-stage converter can appropriately be connectable, by means of appropriate switching devices, to the stator or the rotor. The short-circuiting switch is particularly appropriate for the constitution or discontinuation of the short-circuit (optionally via resistors) and, optionally, of grounding.

In a preferred variant, the short-circuiting device comprises a plurality of resistance elements, which are connected to a (optionally grounded) star point. This constitutes a particularly effective variant of the short-circuiting device for a multi-phase AC voltage connection.

The multi-stage converter preferably comprises a plurality of converter arms, wherein each converter arm comprises a series circuit of two-pole switching modules, wherein each of the switching modules comprises interruptible power semiconductor switches and an energy store. Each of the converter arms appropriately extends between one phase of a first multi-phase AC voltage terminal of the multi-stage converter and one phase of a second multi-phase AC voltage terminal of the multi-phase converter. The power semiconductor switches can be, for example, IGBTs, IGCTs or similar.

The multi-stage converter preferably comprises an n-phase first AC voltage terminal, which is connected to the asynchronous machine, and an m-phase second AC voltage terminal, which is connected to the AC voltage grid, wherein each of the n phases of the AC voltage input is connected to each of the m phases of the second AC voltage terminal via exactly one of the converter arms. The connection to the AC voltage grid can also be constituted, for example, via a transformer.

According to one form of embodiment of the invention, the power semiconductor switches (semiconductor switches for short) and the energy store of the switching modules are respectively interconnected in a full-bridge circuit. A full-bridge module circuit is characterized in that two series circuits of two semiconductor switches are connected in parallel, wherein the energy store, generally in the form of a capacitor, is arranged in parallel with the series circuits of semiconductor switches. The full-bridge module circuit comprises two terminals or poles, one of which is arranged with a potential point between the semiconductor switches of one series circuit, and the other of which is arranged with a potential point between the semiconductor switches of the other series circuit. On the terminals of the semiconductor switching module, an energy store voltage which is present across, or on the energy store, a zero voltage, or the inverse energy store voltage can be generated. It is further possible that, additionally, at least one charging resistor is provided, which is arranged in one of the converter arms and can be bypassed by means of a bypass switch. The function of the charging resistor is the pre-charging of the energy stores of the switching modules. Each of the converter arms can be equipped with a charging resistor of this type.

The multi-stage converter is preferably connected to the AC voltage grid via a transformer. The arrangement can moreover comprise further components such as, for example, a grounding or short-circuiting device and/or a star point reactor for symmetrizing asymmetrical faults, which are arranged between the multi-stage converter and the transformer.

According to one form of embodiment of the invention, the asynchronous machine is mechanically connectable, on the input side, to a turbine of a conventional energy system. A turbine of this type can be, for example, a gas turbine, a steam turbine or a turbine driven by water power. Particularly in this form of embodiment of the invention, a start-up of the turbine can advantageously be permitted wherein, by means of the multi-stage converter, electrical energy which is tapped from the AC voltage grid is converted into mechanical energy of rotation of the turbine.

Appropriately, the turbine is operable at a turbine frequency, wherein the turbine frequency and the frequency of the AC voltage grid are different. In this manner, for example, by means of the arrangement, a 50 Hz turbine can be operated in conjunction with a 60 Hz AC voltage grid (or vice versa). Moreover, generators having a pole pair number greater than one can also be connected to an AC voltage grid with a differing network frequency, including, optionally, in a super-synchronous operating mode. This permits the operation of variable-frequency and non-grid-synchronized turbines.

The arrangement preferably comprises a control apparatus for controlling the multi-stage converter. According to one form of embodiment of the invention, the control apparatus is designed to regulate reactive power on the asynchronous machine and in the AC voltage grid. Thus, by means of the modular multi-stage converter, the arrangement itself can supply the requisite reactive power, on both the grid side and the generator side.

The invention further relates to a method for operating an arrangement for injecting electrical energy into an AC voltage grid, having an asynchronous machine.

The object of the invention is the proposal of a method of this type, which can be implemented as cost-effectively and as flexibly as possible.

According to the invention, this object is fulfilled by a generic method, wherein the asynchronous machine, in the generator operating mode, is double-fed by the employment of a modular multi-stage converter in a matrix configuration, and a start-up of the asynchronous machine is executed by means of the modular multi-stage converter, with a rotor or a stator of the asynchronous machine short-circuited.

The essential advantages of the method according to the invention correspond to those described above with reference to the arrangement according to the invention.

In particular, the method according to the invention is also advantageous in comparison with a start-up of the asynchronous machine by means of the multi-stage converter without the short-circuiting of the stator or rotor, i.e. with the same circuit connection as in the normal operation of the arrangement. This would only be appropriate and cost-effective with effect from a minimum speed of rotation of the turbine which exceeds one third of the nominal speed.

According to one variant of embodiment of the method, for the start-up of the asynchronous machine, the stator is short-circuited, wherein the rotor is supplied, by means of the multi-stage converter, with a start-up frequency which lies below a network frequency of the AC voltage grid. Accordingly, for the initial run-up or start-up, a configuration of the arrangement which differs from that employed in the normal electricity generating mode is used. The stator is short-circuited, for example by means of one of the above-mentioned variants of the short-circuiting device. For the short-circuiting of the stator, the phase conductors or phase outputs thereof are mutually electrically connected. A procedure of this type is similar to the known procedure in a "squirrel-cage rotor". The multi-stage converter executes a conversion of electric power from the AC voltage grid, and injects the latter into the rotor. The frequency of the injected power or voltage generated by the multi-stage converter is lower than the network frequency. Initially, the start-up frequency can be close to zero. By means of appropriate regulation or control, a desired setting of a drive torque for the shaft of a connected turbine can be achieved.

Preferably, the start-up frequency increases over time. In conjunction with this run-up in speed, the voltage generated by the multi-stage converter and the start-up frequency are appropriately increased in accordance with a U/f characteristic of the asynchronous machine.

A corresponding ramp gradient and the temporal duration of the run-up can thus be appropriately rated or restricted, such that the drive torque required to overcome the moments of inertia of components of the arrangement (for example the turbine blades or the asynchronous machine) and resistances (essentially of the turbo-compressor) does not exceed the pull-out torque of the asynchronous machine at any time. To this end, preferably, a slip frequency of the asynchronous machine is monitored. Alternatively or additionally, a rotor circuit current can be monitored. Optionally, a torque-limiting control, executed by reference to the slip frequency, is also conceivable. Once the start-up frequency has achieved or exceeded a predefined frequency threshold, the short-circuiting of the stator is discontinued, and the stator is connected to the AC voltage grid. Discontinuation of short-circuiting and connection to the AC voltage grid can be executed immediately, or further to a specific time delay. Moreover, it is not necessary for the discontinuation of short-circuiting and the connection to the AC voltage grid to be executed simultaneously. The frequency threshold can be defined in accordance with parameters on the asynchronous machine such as, for example, the inductances of the asynchronous machine and/or a control limit of the multi-stage converter and/or the design of the multi-stage converter. A potential option for the selected frequency threshold is given by the following equation: $n1=\frac{1}{2}*f_{network}/Zp$, where n1 is the frequency threshold, $f_{network}$ is the network frequency and Zp is the pole pair number of the asynchronous machine.

According to a differing variant of embodiment of the method, for the start-up of the asynchronous machine, the rotor is short-circuited, wherein the stator is supplied, by means of the multi-stage converter, with a start-up frequency which lies below a network frequency of the AC voltage grid. Short-circuiting of the rotor can essentially be executed identically to the short-circuiting of the stator.

Again, according to this variant, the start-up frequency preferably increases over time. As described above, in conjunction with this run-up in speed, the voltage generated by the multi-stage converter and the start-up frequency are appropriately increased in accordance with a U/f characteristic of the asynchronous machine. The corresponding ramp gradient and the temporal duration of the run-up can thus be appropriately rated or restricted, such that the drive torque required to overcome the moments of inertia of components of the arrangement (for example the turbine blades or the asynchronous machine) and resistances (essentially of the turbo-compressor) does not exceed the pull-out torque of the asynchronous machine at any time. To this end, preferably, a slip frequency of the asynchronous machine is monitored. Alternatively or additionally, a rotor circuit current can be monitored. Optionally, a torque-limiting control, executed by reference to the slip frequency, is also conceivable. Once the start-up frequency has achieved or exceeded a predefined frequency threshold, the short-circuiting of the rotor is discontinued, the stator is connected to the AC voltage grid, and the rotor is connected to the multi-stage converter. It is not absolutely necessary for the individual steps to be executed at the same time points.

The phase of the method preceding the overshoot of the frequency threshold can also be described as the first start-up phase.

According to a further variant of embodiment of the method, a second start-up phase is provided. Accordingly, the start-up frequency, in excess of the frequency threshold, is further increased, and the asynchronous machine is supplied with the start-up frequency, by means of the multi-stage converter, until a second frequency threshold is achieved. During the second start-up phase, the multi-stage converter is operated in a motor mode. The circuit connection corresponds to that which is employed in the normal operation of the arrangement (generator operation). Accordingly, in the second start-up phase, the turbine system is further accelerated (for example, in the context of appropriate torque control) by means of rotor currents generated by the multi-stage converter having an appropriate start-up frequency and direction of rotation. In the particular case of sub-synchronous operation, the starting frequency on the multi-stage converter can be reduced as the speed run-up increases, by a relationship which will be known to a person skilled in the art: $fc=f_{network}-n*Zp\pm fs$, where fs is a slip frequency, $f_{network}$ is the network frequency, Zp is the pole pair number of the asynchronous machine, fc is the starting frequency on the multi-stage converter (equal to the start-up frequency) and n is a constant. The second frequency threshold preferably lies close to the nominal speed of the asynchronous machine.

In general, the turbine can be employed throughout the method described, or can be employed to support individual elements thereof. With the support of the turbine, the run-up time can advantageously be shortened. Typically, ignition of the turbine can be executed, for example, at a start-up frequency which corresponds to approximately 25% of the nominal speed of the turbine. Full turbine torque can be achieved at approximately 70% of the nominal speed.

Optionally, operation of the asynchronous machine in motor mode can be reduced or terminated with effect from the ignition of the turbine. It is conceivable for the second start-up phase of the method to be omitted, wherein the turbine, further to the achievement of the first frequency threshold by means of the start-up frequency, is further accelerated by its own power. In the meantime, in such a case, the prepared reconfiguration of the multi-stage converter for operation in a normal or generator mode can be brought forward in time.

A third start-up phase of the method can be defined. In the third start-up phase, a transition to a normal or generator operating mode is executed. Appropriately, control of the arrangement can switch over to a control mode for constant speed regulation. Control can thus be superordinate, or can be integrated in the controller of the multi-stage converter. A rational distribution of control functions can be provided as follows:

Rapid converter control; setting of the desired speed and/or working point is achieved by the generation of a generator torque which counteracts the turbine;

A superordinate, low-speed turbine control, the function of which is the adjustment of power injection and/or of electricity generation.

The invention is described in greater detail hereinafter with reference to FIGS. 1 to 5.

BRIEF DESCRIPTION OF THE SEVERAL VIEWS OF THE DRAWING

FIG. 6 shows a schematic flow diagram for an exemplary embodiment of a method according to the invention.

DETAILED DESCRIPTION OF THE INVENTION

Figure 1:
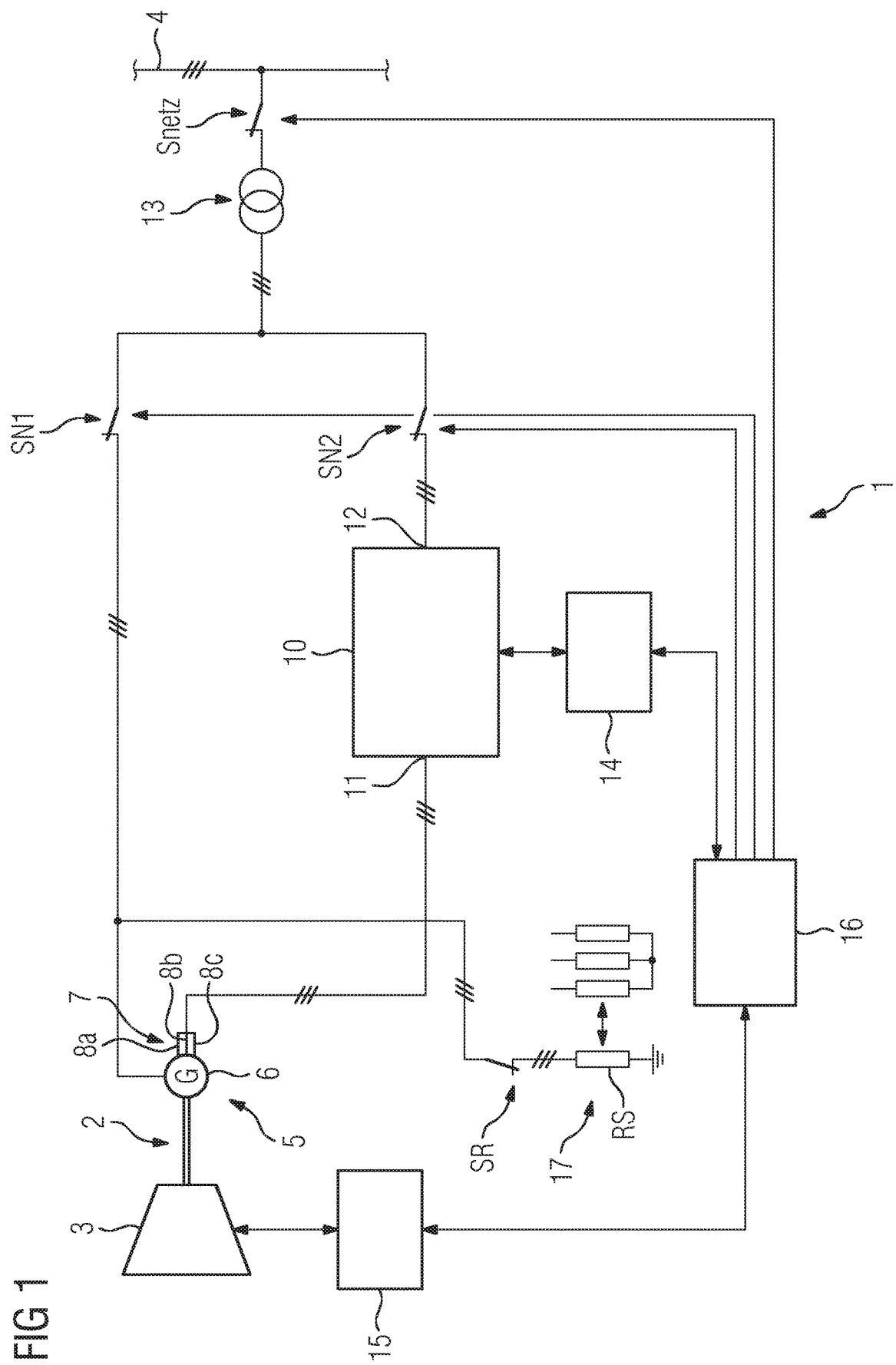
FIG. 1 shows a first exemplary embodiment of an arrangement according to the invention, in a schematic representation.

Specifically, FIG. 1 represents an arrangement 1, by means of which mechanical energy which is delivered at an output 2 of a turbine 3 can be converted into electrical energy and injected into an AC voltage grid 4. The turbine 3 is a gas turbine and, according to the example represented in FIG. 1, operates at a turbine frequency of 50 Hz. In the example represented here, the network frequency in the AC voltage grid 4 is 60 Hz.

Figure 3:
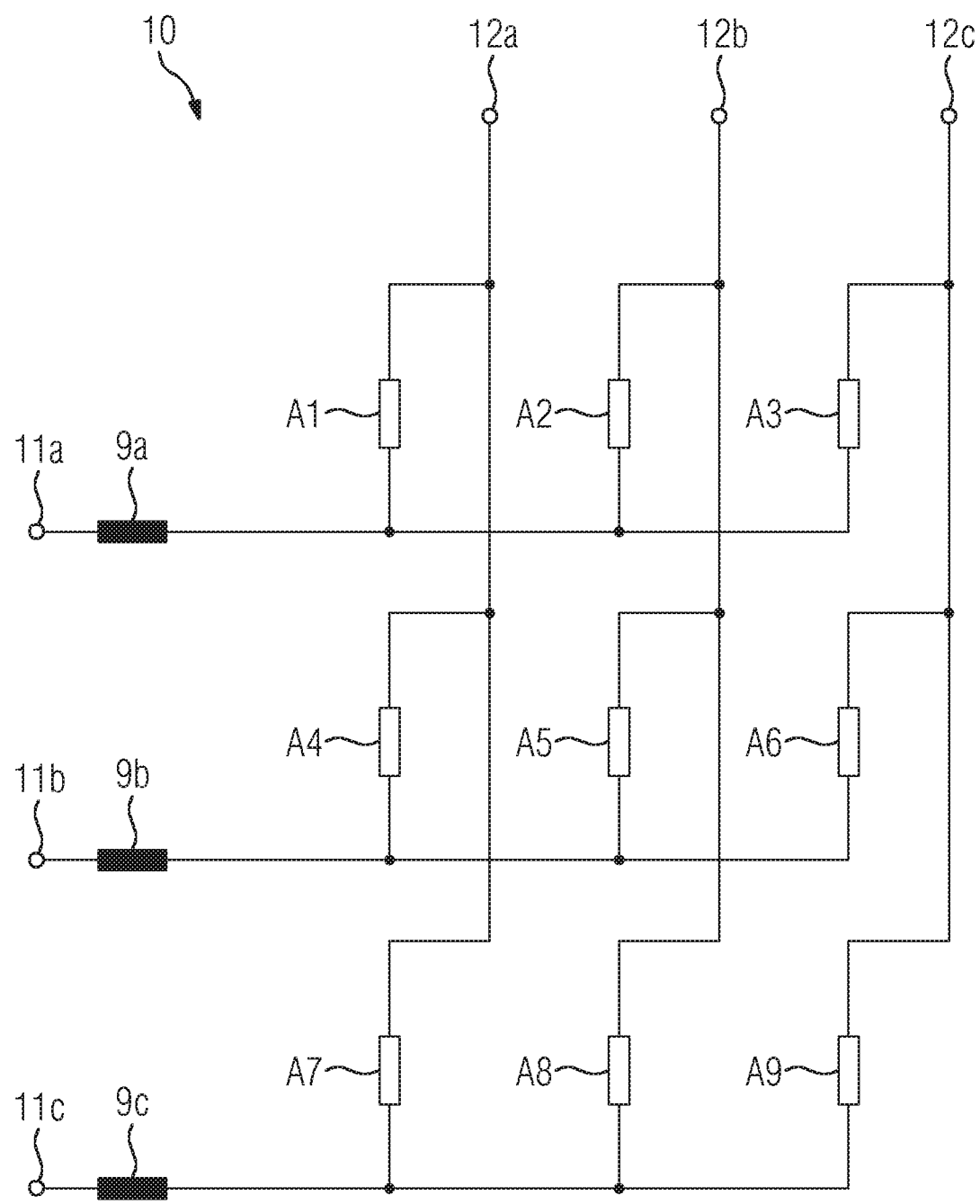
FIG. 3 shows an example of a modular multi-stage converter in a matrix configuration, for the arrangements according to FIGS. 1 and 2.

The arrangement 1 comprises an asynchronous machine 5 in the form of a double-fed asynchronous generator (DFIG). The asynchronous machine 5 comprises a stator 6, which is directly connected to the AC voltage grid 4. The asynchronous machine 5 further comprises a rotor 7 which, by means of sliprings 8a-c and via optional smoothing inductances 9a-c (c.f. FIG. 3), is connected to a first three-phase AC voltage terminal 11 of a modular multi-stage converter 10 in a matrix configuration. The stator 6 can be short-circuited by means of a short-circuiting device 17. The short-circuiting device 17 comprises a short-circuiting switch SR arranged in series with three resistance elements Rs which are interconnected in a grounded star point circuit 18. In general, grounding of the short-circuiting circuit is optional. The arrangement 1 further comprises a network switch $S_{network}$ and two further switches SN1 and SN2.

The multi-stage converter 10 further comprises a second three-phase AC voltage terminal 12, which is connected to the AC voltage grid 4 via a transformer 13. In the example represented, the transformer 13 executes the step-up transformation of the grid-side voltage on the multi-stage converter 10 to 25 kV. The layout of the multi-stage converter 10 is described in greater detail with reference to FIG. 3 hereinafter.

The arrangement moreover comprises a control apparatus 14 which is designed for controlling the current and voltage on both the grid side and the rotor side of the multi-stage converter 10 by the appropriate actuation of power semiconductor switches of the multi-stage converter 10. A turbine controller 15 is further provided for controlling the turbine 3.

A superordinate control apparatus 16, in consideration of actual measured values from the AC voltage grid 4, appropriately executes the control of the switching devices of the arrangement 1, and influences the control of the turbine 3 and of the multi-stage converter 10.

In a generator operating mode of the arrangement 1, in which electrical energy which is generated by means of the turbine 3 is injected into the AC voltage grid 4, the first switch SN1 and the second switch SN2 are closed. The short-circuiting switch SR is opened, such that the stator 6 is directly connected (via the transformer 13) to the AC voltage grid 4.

For the start-up of the turbine-asynchronous machine system 3, 5, in a first phase, the first switch SN1 is initially opened and the short-circuiting switch SR is closed. The stator 6 is thus short-circuited. The multi-stage converter 10 is switched over to a motor operating mode of the arrangement 1, and supplies electric power to the rotor 7. On the first AC voltage terminal 11, the multi-stage converter 10 generates an output voltage at a start-up frequency which, initially, is close to zero, and increases over time. If, during this process, the start-up frequency exceeds a predefined frequency threshold, the short-circuiting switch SR is opened and the first switch SN1 is closed. In this configuration of the arrangement, further previously described start-up phases can be executed.

Figure 2:
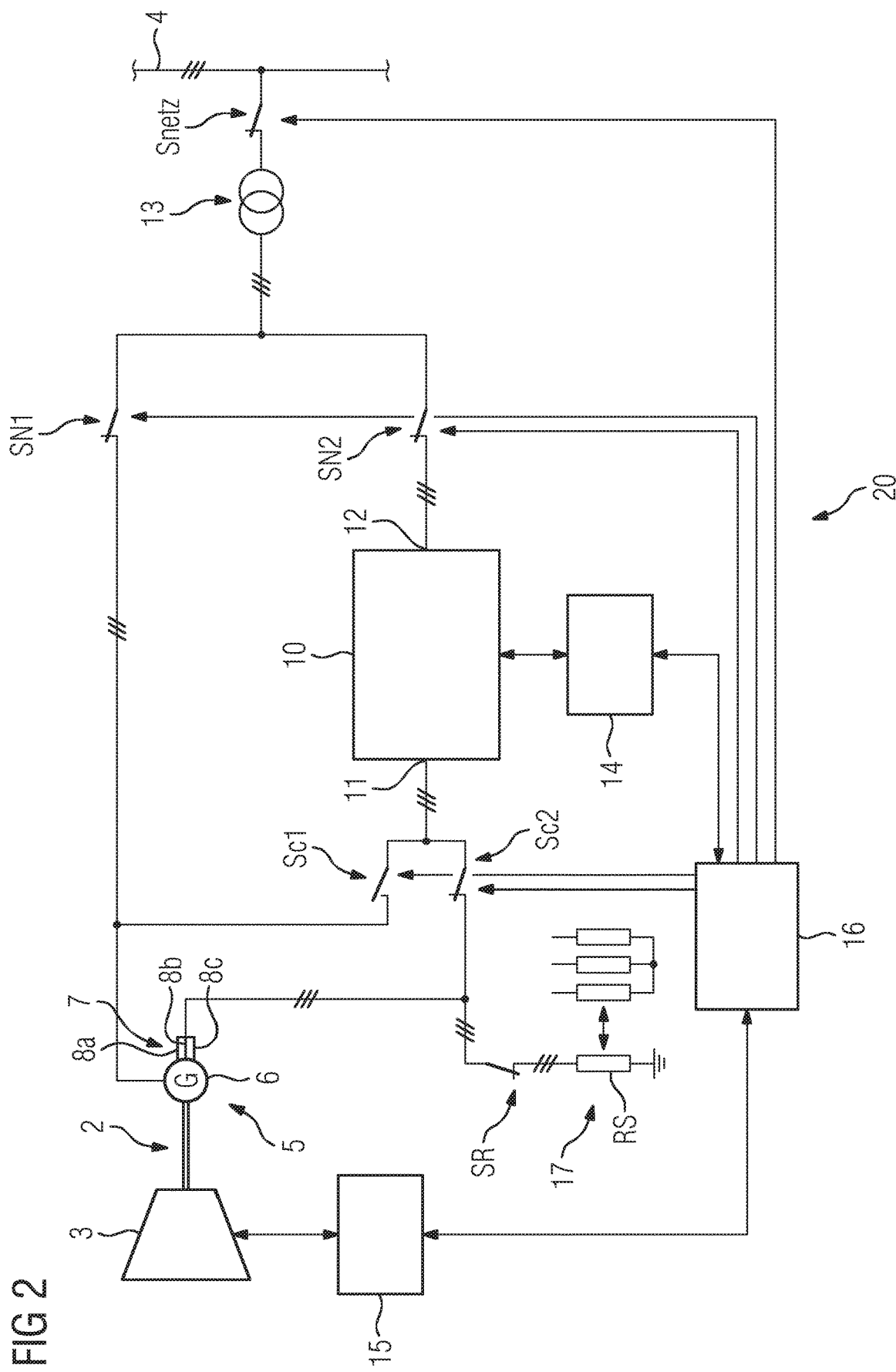
FIG. 2 shows a second exemplary embodiment of an arrangement according to the invention, in a schematic representation.

FIG. 2 shows a second exemplary embodiment of an arrangement 20, by means of which mechanical energy which is delivered at an output 2 of a turbine 3 can be converted into electrical energy and injected into an AC voltage grid. In FIGS. 1 and 2, identical and equivalent elements are identified by the same reference symbols. Consequently, in the interests of clarity, only the differences between the arrangements 1 and 20 will be addressed in greater detail below.

The multi-stage converter 10 is connectable both to the stator 6—by means of a first auxiliary switch Sc1—and to the rotor 7—by means of a second auxiliary switch Sc2. For the start-up of the asynchronous machine 5 or the turbine 3, the first switch SN1 and the second auxiliary switch Sc2 are opened. Concurrently (but not necessarily simultaneously), the first auxiliary switch Sc1 and the short-circuiting switch SR are closed. The rotor 7 is thus short-circuited, and the multi-stage converter 10 supplies the stator. For the normal or generator operating mode, the first switch SN1 and the second auxiliary switch Sc2 are closed, whereas the short-circuiting switch SR and the second auxiliary switch Sc2 are opened. The multi-stage converter 10 thus supplies the rotor 7, whereas the stator 6 is connected to the AC voltage grid 4.

FIG. 3 shows a modular multi-stage converter 10 in a matrix configuration which can be employed, for example, in one of the arrangements 1 or 20 according to FIGS. 1 and 2.

The multi-stage converter 10 comprises nine converter arms A1-A9, wherein one phase respectively of the first AC voltage terminal 11a-c is connected to one phase respectively of the second AC voltage terminal 12a-c via one of the converter arms A1-A9. In the exemplary embodiment represented in FIG. 1, all the converter arms A1-A9 are of an identical layout. The layout of the converter arms A1-A9 is addressed in greater detail with reference to FIG. 4 hereinafter. The multi-stage converter 10 further comprises smoothing inductances 9a-c which are assigned to the phases of the first AC voltage terminal 11a-c.

Figure 4:
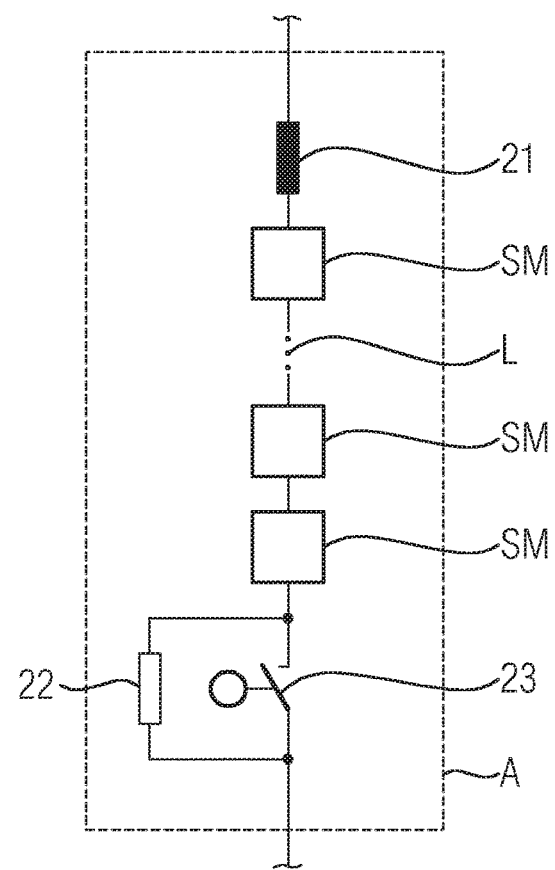
FIG. 4 shows an example of a converter arm of the multi-stage converter according to FIG. 3, in a schematic representation.

FIG. 4 shows an exemplary layout of one of the converter arms A1-A9 for the multi-stage converter 10 according to FIG. 3. Specifically, FIG. 4 shows a converter arm A which can be connected between one phase of a first AC voltage terminal 11a-c and one phase of a second AC voltage terminal 12a-c (c.f. FIG. 3).

The converter arm A comprises a series circuit of two-pole switching modules SM wherein, in the exemplary embodiment represented here, all the switching modules SM are of an identical layout. The number of mutually series-connected switching modules SM, in principle, is arbitrary, and can be adapted to the respective application, as represented in FIG. 4 by a dotted line L. The higher the number of switching modules SM in the converter arm A, the higher the nominal power for which the associated modular multi-stage converter is rated. An arm inductance 21 is arranged in series with the switching modules SM.

The converter arm A further comprises a charging resistor 22, which can be bypassed by means of a controllable switch 23.

Figure 5:
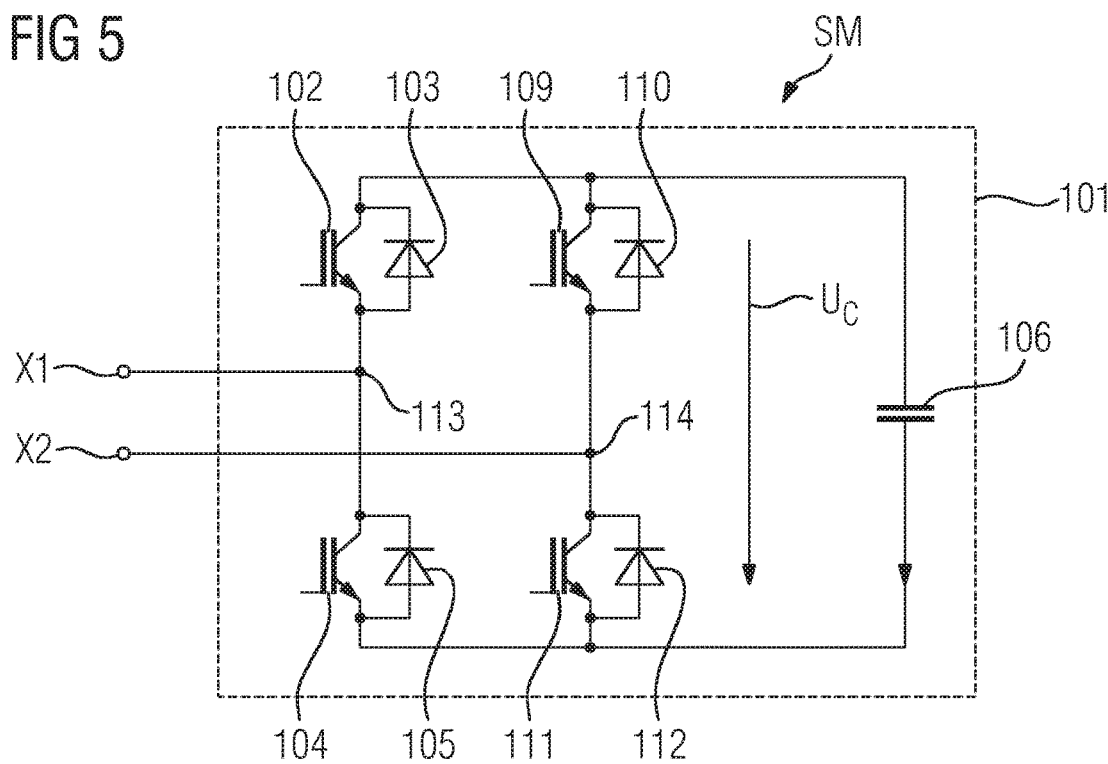
FIG. 5 shows an example of a switching module of the arrangement according to FIGS. 1 to 4, in a schematic representation.

An example of a switching module SM in the form of a full-bridge module circuit 101 is schematically represented in FIG. 5. The full-bridge circuit 101 comprises a first semiconductor switch 102 in the form of an IGBT to which a first freewheeling diode 103 is connected in an antiparallel arrangement, and a second semiconductor switch 104 in the form of an IGBT to which a second freewheeling diode 105 is connected in an antiparallel arrangement. The forward direction of the two semiconductor switches 102 and 104 is co-directional. The full-bridge circuit 101 further comprises a third semiconductor switch 109 in the form of an IGBT to which a third freewheeling diode 110 is connected in an antiparallel arrangement, and a fourth semiconductor switch 111 in the form of an IGBT to which a fourth freewheeling diode 112 is connected in an antiparallel arrangement. The forward direction of the two semiconductor switches 109 and 111 is co-directional. The semiconductor switches 102 and 104, with their associated freewheeling diodes 103, 105, thus constitute a series circuit, which is connected in parallel with a series circuit which is constituted by the semiconductor switches 109, 111 and their associated freewheeling diodes 110 and 112. An energy store in the form of a capacitor 106 is arranged in parallel with the two series circuits. A first pole or terminal X1 of the switching module SM is arranged on a potential point 113 between the semiconductor switches 102, 104, and a second pole or terminal X2 of the switching module SM is arranged on a potential point 114 between the semiconductor switches 109, 111.

By an appropriate actuation of the semiconductor switches 102, 104, 109 and 111, a voltage on the terminals X1, X2 can be generated which corresponds to the voltage Uc present on the capacitor 106, to the voltage across the capacitor 106 but with an inverse polarity (–Uc) or to a zero voltage. It should be observed that, in place of IGBTs, other closable and interruptible semiconductor switches, such as e.g. IGCTs, can also be employed.

FIG. 6 represents a flow diagram. The flow diagram illustrates an exemplary embodiment of a method for operating one of the arrangements according to FIG. 1 or 2.

For the start-up of an arrangement for injecting electrical energy into an AC voltage grid, having an asynchronous machine, wherein said asynchronous machine, in the generator operating mode, is double-fed by the employment of a modular multi-stage converter in a matrix configuration, the procedure applied is as follows.

In a first process step 201, the stator or the rotor of the asynchronous machine is short-circuited. If the stator is short-circuited, the multi-stage converter is connected to the rotor. If the rotor is short-circuited, the multi-stage converter is connected to the stator.

Thereafter, in a second process step 202, the asynchronous machine, in a motor operating mode, by means of the multi-stage converter, is supplied with a start-up frequency which is lower than a network frequency of the AC voltage grid. The start-up frequency increases over time.

In a third process step 203, once the start-up frequency has achieved or exceeded a predefined frequency threshold, the short-circuiting of the stator or the rotor is discontinued. The stator is connected in circuit such that it is connected to the AC voltage grid. The multi-stage converter supplies the rotor.

In a fourth process step 204, the start-up frequency is further increased beyond the frequency threshold. The asynchronous machine is supplied with the start-up frequency by means of the multi-stage converter, until the start-up frequency achieves a second frequency threshold. The second frequency threshold lies close to a nominal frequency of the turbine.

Thereafter, in a fifth process step 205, a switchover to the generator operating mode is executed, such that the energy generated by means of the turbine is converted into electrical energy and is injected into the AC voltage grid.

The invention claimed is:

1. A configuration, comprising:
a modular multi-stage converter in a matrix configuration; and
an asynchronous machine having a rotor and a stator, wherein the configuration is set up to operate in a generator mode for an injection of electrical energy into an AC voltage grid, wherein said asynchronous machine being operable in a double-fed configuration, wherein said asynchronous machine being connectable to the AC voltage grid by means of said modular multi-stage converter, and wherein said modular multi-stage converter is configured to operate in a motor mode of the configuration for a start-up of said asynchronous machine;
said modular multi-stage converter configured to supply said rotor with a start-up frequency that increases over time during the start-up of said asynchronous machine;
said modular multi-stage converter configured to short-circuit said stator during the start-up of said asynchronous machine until the start-up frequency has achieved or exceeded a predefined frequency threshold, and said modular multi-stage converter configured to discontinue short-circuiting said stator and to connect said stator to the AC voltage grid once the start-up frequency has achieved or exceeded the predefined frequency threshold;
wherein the predefined frequency threshold is dependent on parameters defining at least one electrical property of said asynchronous machine; and
wherein said modular multi-stage converter is rated for a nominal capacity of between 20% and 50% of a nominal input power of said asynchronous machine.

2. The configuration according to claim 1, wherein said modular multi-stage converter is connectable to said rotor of said asynchronous machine.

3. The configuration according to claim 1, further comprising switching devices and said modular multi-stage converter, by means of said switching devices, is connectable to said rotor or said stator of said asynchronous machine.

4. The configuration according to claim 2,
further comprising a short-circuiting device for short-circuiting of said rotor or for short-circuiting of said stator; and
wherein said short-circuiting device has a plurality of resistance elements, which are connected to a star point.

5. The configuration according to claim 4, wherein the star point of said short-circuiting device is grounded.

6. The configuration according to claim 1, wherein said modular multi-stage converter contains a plurality of converter arms, wherein each of said converter arms contains a series circuit of two-pole switching modules, wherein each of said two-pole switching modules has interruptible power semiconductor switches and an energy store.

7. The configuration according to claim 6, wherein said modular multi-stage converter has an n-phase first AC voltage terminal, which is connected to said asynchronous machine, and an m-phase second AC voltage terminal, which is connected to the AC voltage grid, wherein each of n phases of said n-phase first AC voltage terminal is connected to each of m phases of said m-phase second AC voltage terminal via exactly one of said converter arms.

8. The configuration according to claim 6, wherein said interruptible power semiconductor switches and said energy store of said switching modules are respectively interconnected in a full-bridge circuit.

9. The configuration according to claim 1, further comprising a transformer and said modular multi-stage converter is connected to the AC voltage grid via said transformer.

10. The configuration according to claim 1, further comprising a turbine and said asynchronous machine is connected, on an input side, to said turbine of a conventional energy system.

11. The configuration according to claim 1, further comprising a controller by means of which reactive power on said asynchronous machine and in the AC voltage grid is controllable.

12. A method for operating a configuration for injecting electrical energy into an AC voltage grid, the configuration having an asynchronous machine, the method comprising the steps of:
double-feeding the asynchronous machine, in a generator operating mode, by employment of a modular multi-stage converter in a matrix configuration, wherein the modular multi-stage converter is rated for a nominal capacity of between 20% and 50% of a nominal input power of the asynchronous machine; and
executing a start-up of the asynchronous machine by means of the modular multi-stage converter;
wherein, for the start-up of the asynchronous machine, the rotor is supplied, by means of the modular multi-stage converter, with a start-up frequency that increases over time; and
wherein, for the start-up of the asynchronous machine, the modular multi-stage converter short-circuits the stator during the start-up of the asynchronous machine until the start-up frequency has achieved or exceeded a predefined frequency threshold, and the modular multi-stage converter discontinues short-circuiting the stator and connects the stator to the AC voltage grid once the start-up frequency has achieved or exceeded the predefined frequency threshold; and
wherein the predefined frequency threshold is dependent on parameters defining at least one electrical property of said asynchronous machine.

13. The method according to claim 12, wherein the start-up frequency lies below a network frequency of the AC voltage grid.

14. The method according to claim 12, wherein, for the start-up of the asynchronous machine, the rotor is short-circuited, wherein the stator is supplied, by means of the modular multi-stage converter, with a start-up frequency which lies below a network frequency of the AC voltage grid.

15. The method according to claim 14, wherein the start-up frequency increases over time and wherein, once the start-up frequency has achieved or exceeded a predefined frequency threshold, a short-circuiting of the rotor is discontinued, wherein the stator is connected to the AC voltage grid and the rotor is connected to the modular multi-stage converter.

16. The method according to claim 12, wherein the start-up frequency, in excess of the predefined frequency threshold, is further increased, and the asynchronous machine is supplied with the start-up frequency, by means of the modular multi-stage converter, until a second frequency threshold is achieved.

17. The method according to claim 15, wherein the start-up frequency, in excess of the predefined frequency threshold, is further increased, and the asynchronous machine is supplied with the start-up frequency, by means of the modular multi-stage converter, until a second frequency threshold is achieved.

18. The method according to claim 12, wherein the at least one electrical property includes inductances of the asynchronous machine.

19. The configuration according to claim 1, wherein the at least one electrical property includes inductances of the asynchronous machine.

* * * * *